Feb. 23, 1960

J. E. GORGENS 2,925,734

GAUGE WITH FLEXIBLE STEM

Filed Dec. 27, 1954

Inventor
Joseph E. Gorgens
by Roberts, Cushman & Grover
Attys

Feb. 23, 1960 — J. E. GORGENS — 2,925,734
GAUGE WITH FLEXIBLE STEM
Filed Dec. 27, 1954 — 3 Sheets-Sheet 2

Inventor
Joseph E. Gorgens
by Roberts, Cushman & Grover
Att'ys

Feb. 23, 1960

J. E. GORGENS 2,925,734

GAUGE WITH FLEXIBLE STEM

Filed Dec. 27, 1954

Inventor
Joseph E. Gorgens
by Roberts, Cushman & Grover
Attrys

United States Patent Office 2,925,734
Patented Feb. 23, 1960

2,925,734

GAUGE WITH FLEXIBLE STEM

Joseph E. Gorgens, Easton, Conn., assignor to Manning, Maxwell & Moore, Incorporated, Stratford, Conn., a corporation of New Jersey Application December 27, 1954, Serial No. 477,801

13 Claims. (Cl. 73—362.2)

This invention relates to gauges especially of the dial type used principally for industrial purposes, although, it is to be understood that they may used in any place where it is desirable to indicate temperature or pressure.

The usual gauge of this kind has a circular head containing a dial, a pointer and a transparent gauge glass, and a stem containing a sensitive element operably connected to the pointer to cause it to move along the scale on the dial. The head and stem are usually fixed with reference to each other; hence to meet the many requirements of industry the instrument manufacturer must manufacture and keep in stock a large number of instruments, each having different stem connections, some of which may stay in his stock of obsolescence. Because of this, aside from a few standard type instruments, manufacture is largely by specification with the result that the economies in manufacture customarily realized by mass production methods cannot be attained.

The principal object of this invention is to provide an instrument of wide use which is attained by so devising its parts that the stem can be placed in substantially any angular position in accordance with the requirement of the particular installation and yet the head may be oriented after installation so as to place its dial in readable position without spoiling or otherwise affecting its accuracy or its initial calibration. Another object is to provide an instrument in which the position of the head and stem may be fixed after adjustment to a desired position until a change is required. Another object is to provide an instrument in which the operating mechanism is concealed from exposure to dampness, corrosion and other adverse conditions which might affect its accuracy or sensitiveness thus making it possible to use less expensive materials in the manufacture of its operating parts. Still other objects are to provide an instrument which is extremely rugged in construction, which will withstand considerable abuse without failure, which is susceptible of mass production because of the simplicity of its parts, which affords a very pleasing appearance and which has the highest degree of accuracy of instruments of this kind.

As herein illustrated the gauge has a head and stem containing respectively, a dial with a pointer for movement therealong and a sensitive element which is operatively connected to the pointer. In accordance with the invention there is means connecting the head to the stem in such fashion that the stem cannot rotate on its longitudinal axis with respect to the plane of the head and yet the stem may be tilted through an angle of at least 180° with respect to the head in any plane perpendicular to the plane of the head and containing the axis of the stem while the head is held stationary in a readable position. To attain this an element is secured to the head and stem which is axially flexible and transversely resistant to twist. Specifically the element is a hollow bellows tube secured at its ends to the back of the head and one end of the stem with its longitudinal axis coinciding with the longitudinal axis of the stem. The bellows is perfectly flexible on its axis so that it will bend or tilt through an arc of at least 180° in any direction throughout 360° in a plane perpendicular to its axis, but is transversely rigid in torque so that it will not twist. The instrument has a torque transmitting element operably connecting the sensitive element in the stem to the pointer in the head and in accordance with another feature of the invention there is means for controlling the flexing of the torque transmitting so that the calibration of the instrument will not be effected by orientation of the head. The torque transmitting element is in the form of a light coiled spring of sufficient strength to transmit the required torque. In one form of the invention the control means includes one or more pairs of crossed links pivotally and rotatably associated with the head and stem which prevent extension or contraction of the spring regardless of its angular position with reference to its undeflected position without interfering with complete freedom of angular movement of the head and stem. The links are so proportioned that throughout flexure as a result of orientation of the head the head end of the coiled spring will be constrained to travel in an arc about an instantaneous center wherein the length of the coiled spring is held constant regardless of the degree of bend within predetermined limits. Alternatively a pair of spaced parallel links and meshing gear sectors proportioned to effect angular movement of the head relative to the links in the ratio of approximately 3 to 2 is employed to effect the desired aforesaid relationship.

There is also means for locking the link pivots both as to pivotal and rotational freedom of movement so that the head can be fixed at a selected angular position with reference to the stem.

The bellows is preferably sealed at its ends to the head and stem so that it protects the internal operating mechanism of the instrument and may be comprised of stainless steel.

The invention will now be described in greater detail with reference to the accompanying drawings wherein.

Figure 1:
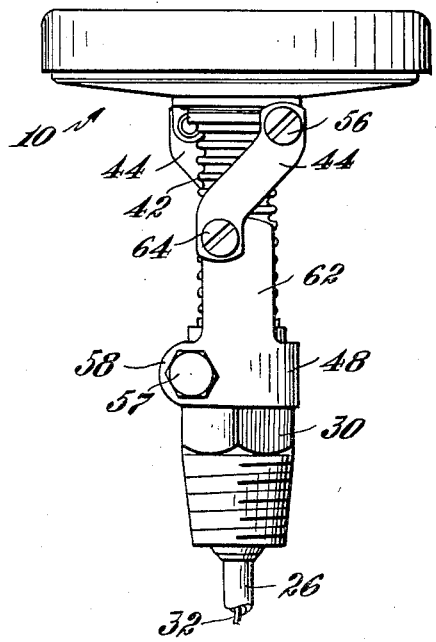
Fig. 1 is an elevation of the instrument as seen from one side with the head perpendicular to the axis of the stem.
Figure 7:
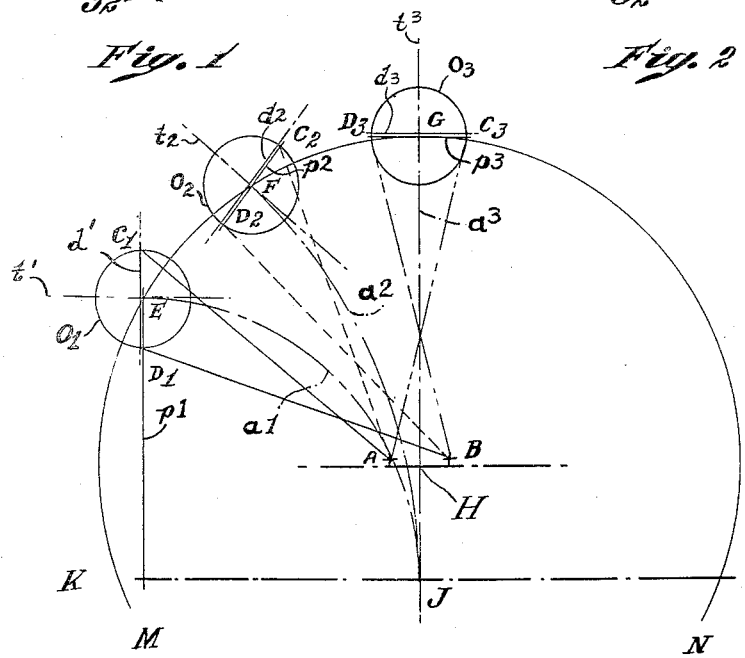
Figure 5:
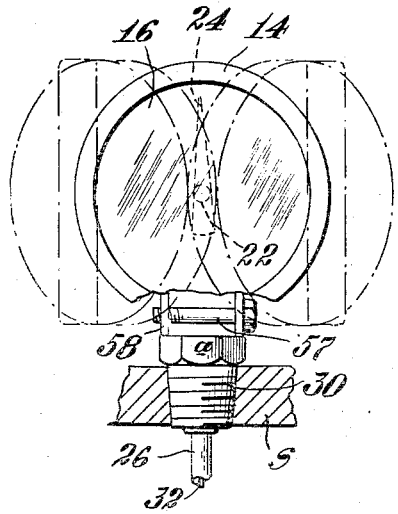
Fig. 5 is an elevation of the instrument from the left side as seen in Fig. 1 showing the stem nipple fixed and the head tilted so that the face of the head is parallel to the axis of the stem and showing in dot and dash lines various angular positions that the head may have about the vertical axis while tilted at right angles of the axis of the stem.
Figure 4:
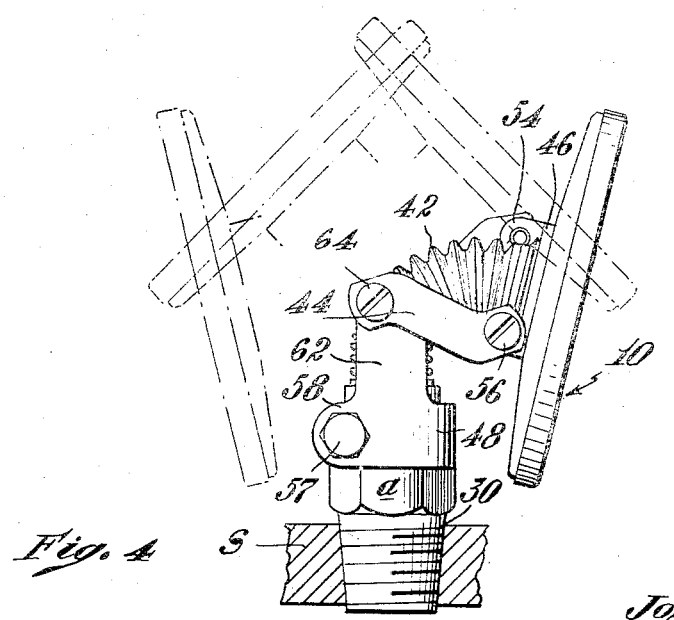
Fig. 4 is an elevation of the instrument corresponding to that of Fig. 1 showing the stem nipple fixed and the head tilted to the right and showing in dot and dash lines various angular positions that the head may have in the plane of the paper with reference to its perpendicular axis.
Figure 8:
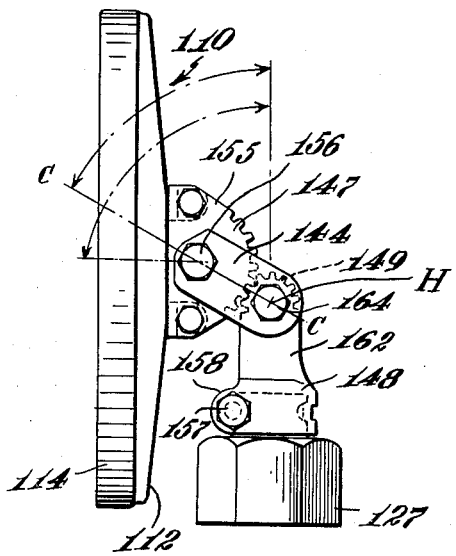
Figure 9:
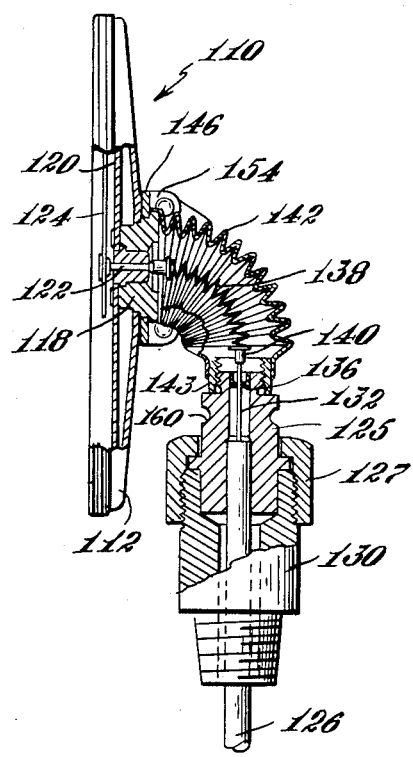
Figure 6:
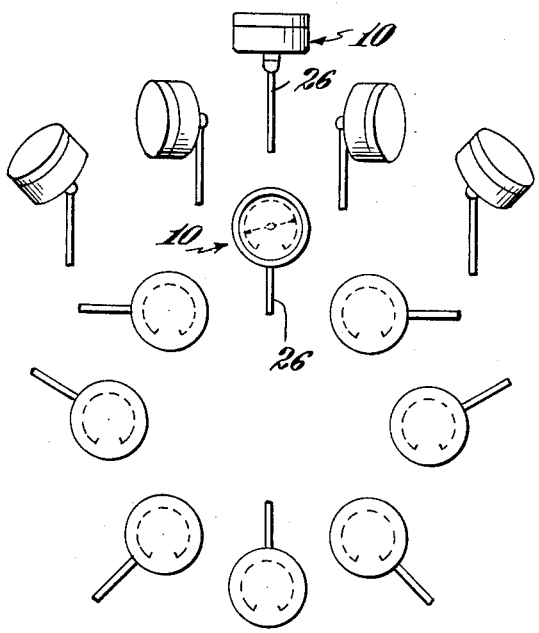

Fig. 6 diagrammatically illustrates the various positions made possible by the multiple adjustments shown in Figs. 4 and 5;

Fig. 7 is a diagrammatic layout showing the geometry of the linkage connecting the head to the stem;

Fig. 8 is an elevation of a modification of the instrument seen from the side corresponding to that shown in Fig. 1 with the head tilted to the left-hand side;

Fig. 9 is a vertical section of Fig. 8; and

Figure 10:
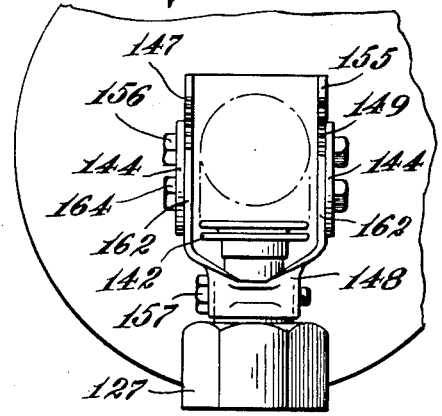

Fig. 10 is an elevation as seen from the right side of Fig. 8.

Figure 3:
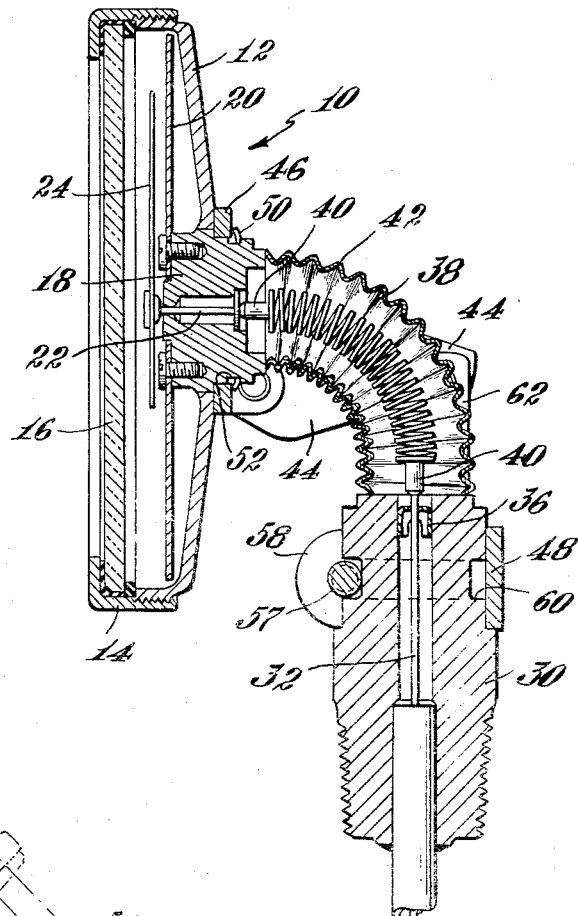
Fig. 3 is a vertical section of the instrument to larger scale as seen from the near side of Fig. 1 with the head tilted at an angle of substantially 90° to the left with reference to the axis of the stem.
Figure 3:
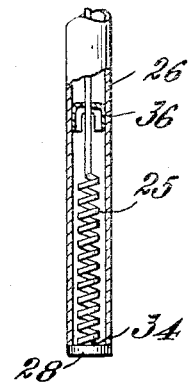

Referring to the figures the instrument which may be a thermometer for indicating temperatures or a pressure gauge for indicating pressures has a head 10 (Fig. 3) consisting of a circular cup-shaped case 12 which forms the backside of the instrument to the forward edge of which is screwed a bezel 14 for securing a transparent gauge glass 16 across the front side. A bearing block 18 is secured in an opening centrally of the back 12, for example by welding with portions extending forwardly into the case and rearwardly therefrom. The forwardly extending portion of the bearing block 18 has fastened to it a dial plate 20 having a suitable scale inscribed or otherwise fastened thereto. The bearing block is axially bored to provide a bearing substantially at the geometrical center of the head in which a pointer staff 22 is rotatably mounted with one end extending forwardly into the case for supporting a pointer 24 which is fastened thereto for movement with reference to the scale on the dial and with its opposite end extending rearwardly for connection with suitable mechanism, which will be described hereinafter, for turning it in response to a sensitive element 25 located in a stem 26. The stem 26 is of tubular form sealed at its lower end by a cap 28 and is fastened at its upper end into a threaded nipple 30 by which it may be screwed into a threaded opening in a support s (Figs. 4 and 5) associated with the installation with which it is to be used. The sensitive element 25 is in the form of a coil which tends to expand or contract with changes in ambient conditions. As herein shown, it is a flat bi-metallic coil which will respond to a change in temperature to effect rotation of a shaft 32 fast to its upper end. If the instrument is to be used for pressure a coiled Bourdon tube is substituted for the bi-metallic coil which will respond to a change in pressure in like manner to cause rotation of the shaft 32. The lower end of the coil is fixed to a stud 34 fast to the inside of the cap 28 so that the coil will not turn freely in the stem and hence displacement of the coil will result in rotation of the shaft 32. Depending upon the length of the shaft 32 one or more spaced shaft guides or bearings 36 are placed along the inside of the stem to support the shaft and at least one such guide 36 is located in the bore near the upper end of the nipple 30.

To permit freedom of orientation of the head with reference to the stem the shaft 32 is connected to the pointer staff 22 by a flexible torque transmitting element 38. This flexible torque transmitting element is a flat wire coiled edgewise in the form of a long freely flexible spring and is rigidly connected at its opposite ends to the staff 22 and shaft 32 by connector elements 40, for example, by soldering the ends of the spring directly to the flat disk-like heads carried thereby. Since the torque transmitting element 38 is flexible in any direction it is evident that the head 10 and stem 26 may have substantially any angular relation with respect to each other without interfering with the driving connection between the sensitive element and the pointer.

While it is thus possible to tilt the head at any angle with respect to the stem without interfering with transmission of the torque from the sensitive element to the pointer, the head must be fixed so that it will not rotate in the plane of its dial about the axis of the stem in order to preserve a fixed relation between the pointer and the scale and thus to preserve its calibrated accuracy. This is attained herein by providing an element 42 for connecting the head to the stem in such fashion that the head cannot be twisted about the axis of the stem but is allowed to be tilted with respect thereto. As herein illustrated this element 42 is a hollow bellows tube which is perfectly flexible longitudinally but resists twist, that is, is rigid in torque. The element 42 is preferably comprised of stainless steel or some other corrosion resistant material and is welded or otherwise anchored at its ends to the bearing block 18 at the rear of the head and to the upper end of the nipple 30. Besides preventing twisting of the head relative to the stem the bellows tube seals the driving elements within the head and stem thereby protecting the driving elements from exposure to dirt and corrosive atmosphere so that if desired less expensive materials may be used in their manufacture, for example, copper which is very useful for making these internal parts, but which normally does not withstand the corrosive action of acids. While the bellows is described as being comprised of metal it is conceivable and intended to be within the scope of the invention that it can be made of a suitable synthetic material such as nylon or the like plastics which are resistant to corrosion, heat and moisture and which have sufficient strength and flexibility to meet the specification required.

Figure 2:
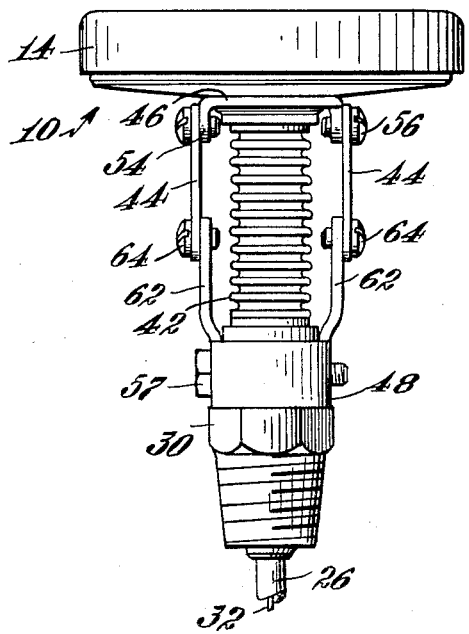
Fig. 2 is an elevation of the instrument as seen from the right-hand side of Fig. 1.

A change in length of the torque transmitting element 38 will cause one of its ends to rotate with reference to the other. This, of course, causes parasitic rotation of the pointer staff and effects the accuracy of the instrument. Accordingly, to preserve accuracy of the instrument the length of the torque transmitting element 38 must be kept constant throughout angular movement of the head with reference to the stem so that it will neither be contracted nor expanded. This is accomplished by using inextensible means 44 in the form of a pair of crossed, rigid metal links (Figs. 1, 2 and 4) for securing the head to the nipple. In its simplest form only two of the links 44 are required. However if desired for smoother manipulation and symmetry in appearance, four links may be used. The links are secured and pivotally connected to the head and nipple by bearing brackets 46 and 48 respectively, rotatably associated with the head and nipple. The bracket 46 consists of a flat rigid plate having a circular opening through it and is mounted on the rearwardly extending portion of the bearing block 18 and retained in place thereon by a spring washer 50 seated in a groove 52 formed in the block rearwardly of the plate. The plate has a pair of diametrically spaced, rearwardly extending ears 54 through which are threaded holes for receiving screws 56 by which the ends of the links are pivotally attached thereto. The bracket 48 is a split cylindrical clamp sleeve mounted on the upper portion of the nipple 30 and clamped thereto by a bolt 57 threaded through ears 58 at its contiguous ends. To prevent axial movement of the clamp on the nipple the latter has a peripheral groove 60 (Fig. 3) and the bolt 57 is so located that a portion of its shank enters the groove. Rising upwardly from the clamp are spaced parallel arms 62 in which are openings for receiving bolts 64 for pivotally attaching the lower ends of the links thereto.

The desired path of movement of the head and the spring is illustrated diagrammatically in Fig. 7 by the arc MN. This path is constructed by first drawing a line GJ which corresponds to the center line of the spring 38 in its straight position and which has a length equal to the full length of the spring. Next a line KJ is drawn perpendicular to the line GJ at J. Selecting arbitrary centers along the line KJ a series of circular arcs $a1$, $a2$ and $a3$ are now drawn, all of which originate at J. These arcs represent the curvature which the center line of the spring corresponding in length to the spring 38 would follow when fixed at one end only and deflected different amounts by applying a bending force to its free end. The arcs will be circular since both ends are subjected to equal and opposite bending moments. In other words, a spring supported only at one end when subjected to a constant bending moment over its entire length has a constant radius of curvature. As the head is inclined to bend the spring the bending moment increases and the radius of curvature decreases. Accordingly, it will be expected that the spring will take a curved path having a radius of curvature with centers along the line KJ or a linear extension thereof. Of course when the spring lies along the line JG the radius of curvature is infinite and the bending moment is equal to the zero. The center line of the pointer staff must be substantially tangent to each of the arcs drawn at point J. Accordingly a pair of dividers are next used to step off on each arc a distance equal to JG starting in each case at point J. The ends of the arcs are marked by a series of dots E, F, etc., and then by trial and error a radius HG is found which describes an arc through the end points of the arbitrary arcs which is the arc MN.

To establish the points A and B perpendiculars $p1$, $p2$, and $p3$ were erected to the lines $t1$, $t2$ and $t3$ drawn tangent to the arcs $a1$, $a2$ and $3a$ at the points E, F and G where the arcs intersect the arc MN. On these perpendiculars there were struck off the bearing center distances C1—D1, C2—D2 and so forth, equal to the spacing of the upper ends of the links 44. By swinging short arcs having as centers C1, C2 and C3 and having radii approximately equal to HC3 it was found that the arcs coincided most nearly at point A, thus establishing the point A. The point B was correspondingly located. The lines AC3 and BD3 accordingly represent the link lengths desired.

The final step consisted of establishing the position of the dash lines which represent the final orientation of the head and bearing locations C1, D1 and so forth, using the finally established link lengths AC3 and BD3 and the centers A and B. This was done by scribing circles $O^1$, $O^2$ and $O^3$ at points E, F and G; then with a radius equal to AC3 and with a center at A; scribing arcs cutting the circles $O^1$, $O^2$ and $O^3$ thereby fixing the final location of points C1, C2 and C3 and similarly the points D1, D2 and D3. The dash lines drawn between the points of intersection show the orientation of the plane of the dial which is parallel to these lines. Perpendiculars drawn to these dashed lines would represent the axes of the pointer staff and would be substantially tangent to the trial arcs at $a^1$, $a^2$ and $a^3$. The dashed lines $c1$—$d1$, $c2$—$d2$ and $c3$—$d3$ do not exactly intersect points E, F and G, but are close enough for practical purposes.

While the geometry of the linkage causes the center of the face of the instrument to move along a slightly elliptical course the length of the links and the center distances of the bearing point have been chosen so that the major and minor axes of the ellipse are very close dimensionally. Moreover, since approximately only one-quarter of the arc MN is used it follows that a close approximation of the required circular motion can be secured by the aforesaid crossed links 44.

The holes in the ends of the links 44 through which the screw bolts 56 and 64 pass for pivotally connecting the links to the brackets 46 and 48 are not threaded; hence by tightening the screw bolts in the brackets after adjustment of the head and stem by rotation of the linkage with reference to the stem the links may be locked in place and thus the head may be fixed with reference to the stem. The bracket 48 may likewise be fixed by tightening the screw bolt 57.

As previously indicated two pairs of links 44 may be employed and, of course, will add strength and symmetry in appearance to the instrument; although, it is to be understood for practical purposes a single pair of links is sufficient.

An alternative construction of the instrument is illustrated in Figs. 8 to 10 inclusive, which has the advantage that the desired movement of the head relative to the stem is accurate as contrasted to the approximation attained with the cross linkage described heretofore. Furthermore the structure is more symmetrical in appearance.

As illustrated the basic parts of the instrument corresponds very closely in construction to that previously described. The head 110 consists of a circular case 112 to the front face of which is secured by a bezel 114 a transparent gauge glass (not shown). A bearing block 118 is secured in the back of the case and provides a support at its inner end for a dial plate 120 and a bearing for a pointer staff 122. The sensitive element (not shown) is located in the stem 126, the latter being fastened at its upper end into a stem adapter 125 which in turn is mounted in the upper end of a threaded nipple 130 and is secured therein by a cap nut 127. The shaft 132 from the sensitive element is journaled in bearings 136 of which there are several distributed along the stem 126 and in the passage through the stem adapter and is operably connected to the pointer staff 122 by the torque transmitting element 138 which as previously pointed out is a coiled spring. The ends of the spring 138 are welded or otherwise fastened to connectors 140 which are respectively fastened to the upper end of the shaft 132 and the rear end of the pointer staff 122. To prevent relative rotation between the head and the stem a bellows element 142 corresponding to that previously described is brazed or welded at its opposite ends to the bearing block 118 and to a sleeve 143, which is crimped to the upper end of the stem adapter 125.

The foregoing elements are substantially similar in all respects to that of the previously described instrument and embody all of the advantages and characteristics related with reference thereto. The present instrument, however, differs with respect to the previously described instrument in the construction of the means provided for controlling the angular movement of the head with reference to the stem so as to preserve the relation desired during angular movement, that is to maintain the length of the spring 138 constant and to maintain the axis of the pointer staff tangent to the arc of the spring at its head at whatever position of curvature it occupies with respect to its stem end. This is accomplished by using instead of crossed links a pair of spaced parallel links 144 which are pivotally connected at their opposite ends to the head and stem by bearing brackets 146 and 148 and pairs of meshing gear sectors 147 and 149 carried respectively by the brackets. The bearing bracket 146 as before consists of a flat rigid plate having a circular opening through it by which it is mounted on the rearwardly extending portion of the bearing block 118 and has projecting rearwardly from it spaced parallel ears 154. Semi-circular plates 155 are bolted to the ears so as to project rearwardly in spaced parallel relation substantially perpendicular to the back of the case. The rear edges of these plates have teeth cut in them which provide the pair of gear sectors 147 referred to above. At the centers of the pitch circles of these gear sectors holes are made in the plates for receiving bolts 156 by which the ends of the links 144 are pivotally secured thereto. The bracket 148 also like that previously described is a split cylindrical clamping sleeve and is mounted on the upper end of the adapter 125 and clamped thereto by a bolt 157 passing through ears 158 at its contiguous ends. To prevent axial movement of the clamp on the adapter the latter has a peripheral groove 160 and the bolt 157 is so located that a portion of its shank enters the groove. Rising upwardly from the clamp are spaced parallel arms 162. The upper ends of the arms have teeth cut in them which provide the other pair of gear sectors 149 referred to above. At the centers of the pitch circles of these gears holes are made for receiving bolts 164 for pivotally attaching the lower end of the links 144 thereto.

The center of the pitch circle of the gear sector 149 is located to coincide with point H (Fig. 7) which is the center of the arc MN described by the end of the spring 138 as it is moved from a 90° bend at the left through a straight position to a 90° bend at the right while maintaining its free length constant. The center of the pitch circle of the gear sector 147 is located to correspond with the head end of the spring 138 which must move along arc MN (Fig. 7). To insure that this path of motion is followed, two links 144 are used for guiding purposes having, as the centers of their link bearings, the centers of the pitch circles of the gears 147 and 149. Hence, the end of the spring 138 which connects to the pointer shaft 122 moves along the arc MN (Fig. 7).

The plane of the head 110 must aways be substantially perpendicular to the end of the spring 138 regardless of the tilt of the head. This is shown graphically in Fig. 7 where lines C1—D1, C2—D2 and C3—D3 represent a plane parallel to the plane of the head 110 in the three positions shown and must be perpendicular to the line of tangency at points E, F and G respectively. When the head moves from a location parallel to line C1—D1 to a position parallel to line C3—D3 it has revolved 90° about a center which has followed arc EG. At the same time the links 144 must move from a position coinciding with line HE to a position identical to line HG. This is a rotation about point H of 60°. To accomplish this, gears 149 and 147 must have a ratio of 2 to 3 approximately.

As in the previously described instrument the bolts 156, 157 and 164 provide means for fixing the head with respect to the stem at a selected position of angular adjustment.

The various positions which the stem may have with reference to the head when it is fixed in a given position or the head may have when the stem is fixed in a given position are shown in Fig. 6. Rather than show a single head with the stem extending in various directions therefrom or a single stem with the head tilted at different angles which would be confusing, each diagram in the figure is representative of a single position attainable. With the head fixed so that its dial faces forwardly, the stem as shown in the lower portion of the figure (Fig. 6), may be pointed in any compass direction (north, south, east or west). With the stem fixed in a vertical position, as shown in the upper part of the figure (Fig. 6), the head may be tilted through an arc of approximately 180° with reference to the horizontal.

The essential aspects of the invention resident in both forms of the invention herein illustrated are complete freedom of movement of the instrument head with respect to the stem without changing the length of the torque transmitting element connecting the sensitive element and the pointer staff and maintenance of the pointer staff substantially tangent to the end of the arc in the torque transmitting element a whatever position of flexure it may occupy. In addition to the foregoing are rigidity between the head and stem which prevents one twisting with respect to the other thereby to maintain calibrated accuracy, sealing of the operating parts which insures longer wear and greater accuracy, simplicity in design, sturdiness, efficiency and attractive appearance.

The instruments described herein are designed specifically for indicating temperature and pressure and have a conventional circular head with a dial and pointer moving about a pivot; however, it is to be understood that the invention is not limited to the purpose for which the instrument is to be used but is equally applicable and useful for any instrument where an indicating head to be readable must be located in a particular position and to reach the medium to be measured the sensing element must be angularly positioned with reference to the head.

It should be understood that the present disclosure is for the purpose of illustration only and that this invention includes all modifications and equivalents which fall within the scope of the appended claims.

I claim:

1. In a gauge, a dial, a pointer and a staff to which the pointer is fixed for rotation with reference to the dial, a stem and a sensitive element contained therein, a longitudinally flexible torque transmitting element which is stiff to twist operably connecting the sensitive element to the pointer staff to effect rotation of the staff and hence displacement of the pointer in response to a change in ambient conditions, said transmitting element permitting tilting of the stem in any direction with reference to that side of the dial from which it stems, and means for maintaining the length of said torque transmitting element constant regardless of the angular position of the stem with respect to the dial, said last-named means being inextensible and connected at its ends respectively to the dial and to the stem.

2. In a gauge, a dial, a pointer and a staff to which the pointer is fixed for rotation with reference to the dial, a stem and a sensitive element contained therein, a coiled spring operably connecting the sensitive element to the pointer staff to effect displacement of the pointer in response to a change in ambient conditions, said coiled spring permitting tilting of the stem in any direction with respect to the plane of the dial from which it stems, and links connecting the dial and the stem, which are so proportioned that the end of the spring connected to the pointer staff is constrained to move along a curved path, the locus of which is defined by the ends of arcs of a predetermined length which correspond to the undeflected length of the spring, said arcs originating at the end of the spring connected to the sensitive element and having their centers located on a line passing through and connected to the sensitive element and perpendicular to the undeflected axis thereof.

3. In a gauge, a dial, a pointer and a staff to which the pointer is fixed for rotation with respect to the dial, a stem and a sensitive element contained therein, a coiled spring operably connecting the pointer staff to the sensitive element, said sensitive element being responsive to changes in ambient conditions to impart rotation to the end of the spring connected thereto, means joining the dial to the stem which is resistant to torque but which is flexible axially and in bending, and means guiding and constraining the end of the spring connected to the pointer staff to move in flexure in a path such that the arc of the spring remains constant in length with respect to the end connected to the sensitive element throughout angular movement of the dial and stem.

4. In a gauge, a dial, a pointer and a staff to which the pointer is fixed for rotation with respect to the dial, a stem and a sensitive element contained therein, a coiled spring operably connecting the pointer staff to the sensitive element, said sensitive element being responsive to changes in ambient conditions to impart rotation to the attached end of the spring, means joining the dial to the stem which is resistant to torque but which is axially flexible, a pair of spaced parallel links pivotally connected at their ends to the dial and stem, the axes of the pivots at the stem end of the links being located at the center of the arc described by the spring when flexed without change of length.

5. In a gauge, a dial, a pointer and a staff to which the pointer is fixed for rotation with respect to the dial, a stem and a sensitive element, a coiled spring operably connecting the pointer staff to the sensitive element contained therein, said sensitive element being responsive to changes in ambient conditions to impart rotation to the attached end of the spring, means joining the dial to the stem which is resistant to torque but which is axially flexible, a pair of spaced parallel rigid links pivotally connected at their ends to the dial and stem, the axes of the pivots at the stem ends of the links being located at the center of the arc described by the end of the spring when freely flexed and a pair of meshing gear sectors fast to the dial and stem respectively, the pitch circles of which are centered respectively at the pivot points of the links, said gear sectors having a ratio of 3 to 2.

6. In a gauge, a dial, a pointer and a staff to which the pointer is fixed for rotation with respect to the dial, a stem and a sensitive element contained therein, a coiled spring operably connecting the pointer staff to the sensitive element, said sensitive element being responsive to changes in ambient conditions to impart rotation to the attached end of the spring, means joining the dial to the stem which is resistant to torque but which is axially flexible, a pair of spaced parallel links pivotally connected at their ends to the dial and stem, the axes of the pivots at the stem ends of the links being located at the center of the arc described by the spring when subjected to cantilever deflection and the axes of the pivots at the dial end of the links lying on the arc described by the dial end of said spring.

7. In a gauge, a dial head, a bracket connected to the back of the dial head, said bracket being rotatable about a line perpendicular to the back of the dial at its geometric center, a stem, a bracket connected to the stem, said bracket being rotatable about the longitudinal center line of the stem, a pair of links connected at their opposite ends to the head and stem brackets respectively, said links constraining the head to move in an arc about a substantially fixed center, a flexible element non-rotatably fixed at its opposite ends to the back of the head and the end of the stem with the ends of its longitudinal axis coinciding respectively with the geometric center of the back of the head and the center line of the stem, said flexible element being rigid in torque and means for fixing the head and stem brackets against rotation.

8. A gauge according to claim 7, wherein the links are parallel and are pivotally connected at their opposite ends on spaced parallel axes parallel to the back of the dial, the plane of said parallel axes containing the geometric center of the back of the dial when the face of the dial is normal to the axis of the stem.

9. A gauge according to claim 7, wherein the head and stem brackets carry gear sectors which mesh, the links are parallel and are pivotally connected at their opposite ends to the brackets at centers corresponding to the centers of the pitch circles of the gear sectors and the proportions of the links and gears are such that when the center lines of the links correspond in direction to the axis of the stem the face of the head is normal to the stem and when the center lines of the links are approximately 60° to the axis of the stem the face of the head is substantially parallel thereto.

10. A gauge according to claim 7, wherein the head and stem brackets carry gear sectors which mesh and have a ratio of 3 to 2 and the links are parallel and pivotally fastened at their ends to the brackets at the centers of the pitch circles of the gear sectors.

11. A gauge according to claim 7, wherein the links lie in spaced parallel planes and cross without intersection, their head ends being pivotally connected to the back of the dial at equal distances from opposite sides of the axis of the pointer staff and the stem ends of the links being pivotally connected to the stem at equal distances from opposite sides of the longitudinal axis of the stem.

12. A gauge according to claim 7, wherein the links lie in spaced parallel planes and cross without intersection, the head ends being pivotally connected to the head bracket at equal distances from opposite sides of said longitudinal axis, and the stem ends of the links being pivotally connected to the stem bracket at equal distances from the opposite sides of said longitudinal axis.

13. A dial instrument of the kind wherein a casing houses a graduated dial, a rotatable pointer staff and a pointer fixed to the forward end of the staff, and which sweeps over the dial as the staff turns, a hollow elongate stem, means whereby the stem may be fixed to a stationary support, a sensitive element within the hollow stem which responds, by rotational motion, to variations in a predetermined physical characteristic, means including a resiliently stretchable part for transmitting said rotational motion of the sensitive element to the rear end of the pointer staff, a hollow tubular member which houses said motion-transmitting part and which is rigidly connected at one end to the casing and at its other end to the stem, said tubular part being resiliently flexible to permit longitudinal bending thereof, but being highly resistant to torque thereby preventing relative rotation of the casing and stem about the axis of the pointer staff, but permitting the casing to be rocked through an arc of at least 90° about an axis perpendicular to that of the pointer staff, and means operative to maintain unchanged the length of said motion-transmitting part when the casing is rocked, said means comprising a bracket device including a member which is associated with the casing and which may be rotated relatively to the casing about the axis of the pointer staff, a second member which is associated with the stem and which may be rotated about the axis of the stem when the axis of the pointer staff coincides with that of the stem, means for clamping both of said bracket members to the casing and stem respectively, and rigid arms connecting the bracket members for relative angular movement about axes perpendicular to that of the pointer staff, said arms being movable in unison with the bracket members about the axis of the stem.

References Cited in the file of this patent

UNITED STATES PATENTS

| | | |
|---|---|---|
| 1,692,301 | Heslewood | Nov. 20, 1928 |
| 1,693,225 | Dunham | Nov. 27, 1928 |
| 1,733,804 | Ileman | Oct. 29, 1929 |
| 2,487,203 | Wilber | Nov. 8, 1949 |
| 2,592,055 | Monahan | Apr. 8, 1952 |
| 2,693,112 | Bech | Nov. 2, 1954 |